United States Patent
Elder et al.

(10) Patent No.: US 7,103,609 B2
(45) Date of Patent: *Sep. 5, 2006

(54) SYSTEM AND METHOD FOR ANALYZING USAGE PATTERNS IN INFORMATION AGGREGATES

(75) Inventors: Michael D. Elder, Greer, SC (US);
James P. Goodwin, Beverly, MA (US);
Jason Y. Jho, Raleigh, NC (US);
Vaughn T. Rokosz, Newton, MA (US);
Matthew Schultz, Ithaca, NY (US)

(73) Assignee: International Business Machines Corporation, Armonk, NY (US)

(*) Notice: Subject to any disclaimer, the term of this patent is extended or adjusted under 35 U.S.C. 154(b) by 393 days.

This patent is subject to a terminal disclaimer.

(21) Appl. No.: 10/286,534

(22) Filed: Oct. 31, 2002

(65) Prior Publication Data

US 2004/0088276 A1    May 6, 2004

(51) Int. Cl.
*G60F 17/30* (2006.01)
*G06N 5/02* (2006.01)

(52) U.S. Cl. .................... 707/102; 707/1; 706/50
(58) Field of Classification Search ........... 707/1–7, 707/100–104.1, 200–202; 713/200–202; 715/500.1, 512, 513; 705/50–52; 709/224–228; 345/440–441; 706/50, 61

See application file for complete search history.

(56) References Cited

U.S. PATENT DOCUMENTS

| 4,908,761 | A | 3/1990 | Tai ........................ 364/401 |
| 5,371,673 | A | 12/1994 | Fan ..................... 364/419.01 |
| 5,745,113 | A | 4/1998 | Jordan et al. ............. 345/349 |
| 5,835,905 | A * | 11/1998 | Pirolli et al. ............. 707/3 |
| 5,933,818 | A | 8/1999 | Kasravi et al. ........... 706/12 |
| 6,006,223 | A | 12/1999 | Agrawa et al. ............ 707/5 |
| 6,018,734 | A | 1/2000 | Zhang et al. ............. 707/3 |
| 6,026,397 | A * | 2/2000 | Sheppard ................ 707/5 |
| 6,070,143 | A | 5/2000 | Barney et al. ............ 705/8 |
| 6,072,493 | A * | 6/2000 | Driskell et al. ......... 715/854 |
| 6,115,718 | A | 9/2000 | Huberman et al. ....... 707/102 |
| 6,138,128 | A | 10/2000 | Perkowitz et al. ....... 707/501 |
| 6,148,294 | A | 11/2000 | Beyda et al. ............ 707/1 |
| 6,177,932 | B1 | 1/2001 | Galdes et al. .......... 345/733 |
| 6,182,067 | B1 | 1/2001 | Presnell et al. ........ 707/5 |
| 6,195,657 | B1 | 2/2001 | Rucker et al. .......... 707/5 |
| 6,199,067 | B1 | 3/2001 | Geller ................. 707/10 |
| 6,212,494 | B1 | 4/2001 | Boguraev .............. 704/9 |
| 6,216,098 | B1 | 4/2001 | Clancy et al. ........... 703/6 |

(Continued)

FOREIGN PATENT DOCUMENTS

EP    1443425 A1 *   8/2004

(Continued)

OTHER PUBLICATIONS

HP invent data sheet, "ap open view smart plug-in for IBM DB2 databases", 2004 6 pages.*

(Continued)

*Primary Examiner*—Srirama Channavajjala
(74) *Attorney, Agent, or Firm*—Shelley M. Beckstrand

(57) ABSTRACT

System and method for evaluating an information aggregate. A metrics database stores document indicia including document attributes, associated persons and usage metrics. A query engine collects a plurality of documents having non-unique values on a shared attribute into an information aggregate and tracks usage metrics with respect to the documents. A visualization engine visualizes the usage metrics with respect to a single aggregate, or as a composite or comparison of usage metrics for a plurality of aggregates.

15 Claims, 6 Drawing Sheets

U.S. PATENT DOCUMENTS

| | | | |
|---|---|---|---|
| 6,233,583 B1 | 5/2001 | Hoth | 707/102 |
| 6,249,779 B1 | 6/2001 | Hitt | 706/1 |
| 6,266,649 B1 | 7/2001 | Linden et al. | 705/26 |
| 6,275,229 B1 * | 8/2001 | Weiner et al. | 715/764 |
| 6,275,820 B1 | 8/2001 | Navin-Chandra et al. | 707/3 |
| 6,334,127 B1 | 12/2001 | Bieganski et al. | 707/5 |
| 6,363,174 B1 | 3/2002 | Lu | 382/209 |
| 6,405,251 B1 * | 6/2002 | Bullard et al. | 709/224 |
| 6,453,246 B1 * | 9/2002 | Agrafiotis et al. | 702/27 |
| 6,486,695 B1 * | 11/2002 | Nakagawara | 326/14 |
| 6,516,416 B1 * | 2/2003 | Gregg et al. | 713/201 |
| 6,654,742 B1 * | 11/2003 | Kobayashi et al. | 707/7 |
| 2002/0035593 A1 | 3/2002 | Salim et al. | 709/202 |
| 2002/0178075 A1 * | 11/2002 | Emerick et al. | 705/26 |
| 2003/0009401 A1 * | 1/2003 | Ellis | 705/35 |
| 2003/0182583 A1 * | 9/2003 | Turco | 713/201 |
| 2004/0030741 A1 * | 2/2004 | Wolton et al. | 709/202 |
| 2004/0049571 A1 * | 3/2004 | Johnson et al. | 709/224 |
| 2004/0117311 A1 * | 6/2004 | Agarwal et al. | 705/52 |
| 2004/0199527 A1 * | 10/2004 | Morain et al. | 707/100 |
| 2005/0210008 A1 * | 9/2005 | Tran et al. | 707/3 |

FOREIGN PATENT DOCUMENTS

| | | | |
|---|---|---|---|
| EP | 1507216 | * | 2/2005 |
| JP | 2001119403 A | | 4/2001 |
| WO | WO 00/79396 | * | 12/2000 |
| WO | WO 0137162 A2 | | 5/2001 |
| WO | WO0201455 A2 | | 2/2002 |
| WO | WO 03/012576 | * | 2/2003 |
| WO | WO2004/049242 | * | 6/2004 |

OTHER PUBLICATIONS

James Pitkow, "using the web as a survey tool:results from the second WWW user survey", 1995, 12 pages.*

Mukherjea, S et al. "visualizing world-wide eb search engine results",Information visualization, 1999,proceedings 1999 IEEE international confeerence on, Jul. 1999, pp. 400-405.*

Gershon,N et al. "case study: visualizing internet resources",information visualization, 1995, proceedings, Oct. 1995, pp. 122-12.*

Tashihiko Yamakami, "Toward understanding the mobile internet user behavior: a methodology for clustering with aging analysis",parallel and distributed computing, applications and technologies, 2003, PCCAT 2003 fourth international conference Aug. 2003, p.*

Himesh patel et al. "new visualization V8.2", SUGI 26 2001, paper #161-26, pp. 1-7.*

Himesh patel et al. "using SAS/GRAPH software to create graphs on the web", SUGI 1999, pp. 1-10.*

Lori Fryzuk "P2 measurement and results database", national office of pollution prevention environment canada, CPPR Victoria Jun. ist 2005.*

Traina,C,Jr. et al. "fast indexing and visualization of metric data sets usingslim-trees", Knowledge and daa engineering, IEEE transactions, vol. 14, issue: 2, 2002, pp. 244-260.*

Stephen Fenstermarker et al. "METRICS: a system architecture for design process optimization", Annual ACM IEEE design automation conference, proceddings of the 37th conference on design automation, 2000, pp. 705-710.*

Sara Irina Fabrikant et al. "formalizing, semantic spaces for information access", annuals o f the association of american geographers, 91(2), 2001, pp. 263-280.*

R.Cooley et al. "web mining: Information and Pattern discovery on the world wide web", 1997.*

Brouillette, S. M. and J. P. Lavelle. *A Methodology for Mapping and Analyzing Community Social Services as a System*.Norcross, 6th Industrial Engineering Research Conference Proceedings. Miami Beach, May 17-18, 1997. Institute of Industrial Engineers, Norcross, GA, 1997. 662-667.

Sack, W. *Diagrams of Social Cohesion.* Association for Computational Linguistics, U of Maryland. MIT Media Laboratory, Jun. 1999. 3 plus 8 pages.

Kautz, H., B. Selman, M. Shah.. *Referral Web: Combining Social Networks and Collaborative Filtering.* Communications of the ACM, vol. 40, No. 3, Mar. 1997, 1-4 pages.

Schwartz, M. F., D. C. M. Wood. *Discovering shared interests using graph analysis.* Communications of the ACM, v. 36 n. Aug. 8, 1993, 78-89.

Wellman, B. *For a social network analysis of computer networks: a sociological perspective on collaborative work and virtual community.* Proceedings of the 1996 conference on ACM SIGCPR/SIGMIS. 1-11.

Qureshi, S.*Supporting electronic groupprocesses: a social perspective.*Proceedings of the 1995 ACM SIGCPR Conference on Supporting teams, groups, and learning inside the IS function. ACM Press. 24-34.

Ackerman, M.S., B. Starr. *Social activity indicators: interface components for CSCW systems.* Proceedings of the 8th ACM Symposium on User Interface and Software Technology. ACM Press. 159-168.

Garton, L., C. Haythornthwaite, B. Wellman. *Studying on-line social networks* in Doing Internet Research, edited by Steve Jones, Thousand Oaks, CA: Sage, 1999, Chapter.-4 pp. 75-105.

Srivastava, Jaidepp, Robert Cooley, Mukund Deshpande, Pang-Ning Tan. *Web Usage Mining: Discovery and Applications of Usage Patterns from Web Data.* SIGKDD Explorations, vol. 1, Issue 2. Jan. 12-23, 2000.

Wang, Y. *Web Mining and Knowledge Discovery of Usage Patterns.* CS748T Project (Part I) Feb. 2000, 25 pages.

Sack, W. *Conversation Map: a content-based Usenet newsgroup browser.* Proceedings of the 2000 International Conference on Intelligent User Interfaces. ACM Press. 233-240.

Kaugers, K. *Integrated multi scale text retrieval visualization.* Conference on Human Factors and Computing Systems, Proceeedings o fthe Conference on CHI 98 Summary: Human Factors in Computing Systems, ISBN: 1-58113-028-7 ACM Digital Library, 1998. 307-308.

Feldman, R. *Mining unstructured data.* Tutorial notes for ACK SIGKDD 1999. ACM Press. 182-236.

* cited by examiner

XML FORMAT FOR SQL QUERIES

QRML STRUCTURE

SYSTEM AND METHOD FOR ANALYZING USAGE PATTERNS IN INFORMATION AGGREGATES

CROSS REFERENCES TO RELATED APPLICATIONS

The following U.S. patent applications are filed concurrently herewith and are assigned to the same assignee hereof and contain subject matter related, in certain respect, to the subject matter of the present application. These patent applications are incorporated herein by reference.

Ser. No. 10/286,211, is now pending filed 31 Oct. 2002 for "SYSTEM AND METHOD FOR DETERMINING FOUNDERS OF AN INFORMATION AGGREGATE";

Ser. No. 10/286,263, is now pending filed 31 Oct. 2002 for "SYSTEM AND METHOD FOR FINDING THE ACCELERATION OF AN INFORMATION AGGREGATE";

Ser. No. 10/286,262, is now pending filed 31 Oct. 2002 for "SYSTEM AND METHOD FOR FINDING THE RECENCY OF AN INFORMATION AGGREGATE";

Ser. No. 10/286,261, is now pending filed 31 Oct. 2002 for "SYSTEM AND METHOD FOR EXAMINING THE AGING OF AN INFORMATION AGGREGATE";

Ser. No. 10/286,212, is now pending filed 31 Oct. 2002 for "SYSTEM AND METHOD FOR DETERMINING CONNECTIONS BETWEEN INFORMATION AGGREGATES";

Ser. No. 10/286,237, is now pending filed 31 Oct. 2002 for "SYSTEM AND METHOD FOR DETERMINING MEMBERSHIP OF INFORMATION AGGREGATES";

Ser. No. 10/286,508, is now pending filed 31 Oct. 2002 for "SYSTEM AND METHOD FOR EVALUATING INFORMATION AGGREGATES BY VISUALIZING ASSOCIATED CATEGORIES";

Ser. No. 10/286,145, is now pending filed 31 Oct. 2002 for "SYSTEM AND METHOD FOR DETERMINING COMMUNITY OVERLAP"; and Ser. No. 10/285,799, is now pending filed 31 Oct. 2002 for "SYSTEM AND METHOD FOR BUILDING SOCIAL NETWORKS BASED ON ACTIVITY AROUND SHARED VIRTUAL OBJECTS".

BACKGROUND OF THE INVENTION

1. Technical Field of the Invention

This invention relates to a method and system for analyzing information aggregates. More particularly, it relates to evaluating information aggregates by visualizing usage patterns.

2. Background Art

Existing systems for knowledge management are focused primarily on individuals and the documents they create. Such systems typically organize documents along two primary dimensions:

1. A physical dimension that reflects a fundamental unit of storage in the underlying system. Examples of physical units of storage include a Notes database (NSF) or a QuickPlace.
2. A topical dimension that collects documents together based on their content or expected usage. Examples of the logical dimension include categories (to group documents that are concerned with a particular topic) or collections (to group documents that are serving a particular purpose).

The user interfaces in existing information systems are therefore concerned with displaying information along these two dimensions. Search interfaces, for example, often allow a search to be scoped based on both the physical and topical dimensions, and of course are focused on returning documents. This approach is useful, but it focuses on what documents are about and not what people do with those documents.

The Lotus Discovery Server (LDS) is a Knowledge Management (KM) tool that allows users to more rapidly locate the people and information they need to answer their questions. It categorizes information from many different sources (referred to generally as knowledge repositories) and provides a coherent entry point for a user seeking information. Moreover, as users interact with LDS and the knowledge repositories that it manages, LDS can learn what the users of the system consider important by observing how users interact with knowledge resources. Thus, it becomes easier for users to quickly locate relevant information.

There is a need, however, to determine which visualizations could be derived from what LDS learns from observing the users. In particular, there is a need to (1) identify trends in knowledge over time, (2) identify those visualizations that allow inferences about how successfully the system is adopted and utilized by users, and (3) identify those visualizations which could help or encourage a higher level of adoption.

The focus of LDS is to provide specific knowledge or answers to localized inquiries; focusing users on the documents, categories, and people who can answer their questions. There is a need, however, to magnify existing trends within the system—thus focusing on the system as a whole instead of specific knowledge.

There is a great deal of existing literature on the analysis of usage patterns on the Web. Web site tracking typically focuses on browsing activity (opens) only, and there is a need to extend this notion to a wider variety of metrics.

Collaborative filtering applications monitor usage patterns and suggest things that might be of interest based on the similarity of an individual's patterns of usage to the patterns of others. However, such systems do not visualize the usage data, and cannot help in generating insights on how a collection of people behave. Additionally, there is a need to generalizes the analysis to collections of documents, whereas collaborative filtering applications are typically concerned with individual documents.

The Lotus Discovery Server collects usage metrics of this sort, but does not create visualizations or reports of them, and does not support the generalized notion of an aggregate.

There is a need in the art to provide a system and method for analyzing the use of general aggregates, such as by the creation of usage graphs, analyzing change in usage over time, and analyzing access patterns in a collaborative environment.

It is an object of the invention to provide an improved system and method for evaluating usage patterns in aggregates.

SUMMARY OF THE INVENTION

A system and method for evaluating information aggregates by collecting a plurality of documents having non-unique values on a shared attribute into an information aggregate; tracking usage metrics with respect to documents in the information aggregate; and visualizing the usage metrics.

In accordance with an aspect of the invention, there is provided a computer program product configured to be operable for evaluating information aggregates by collecting a plurality of documents having non-unique values on a shared attribute into an information aggregate; tracking usage metrics with respect to documents in the information aggregate; and visualizing the usage metrics.

Other features and advantages of this invention will become apparent from the following detailed description of the presently preferred embodiment of the invention, taken in conjunction with the accompanying drawings.

DETAILED DESCRIPTION OF PREFERRED EMBODIMENTS

Figure 1:
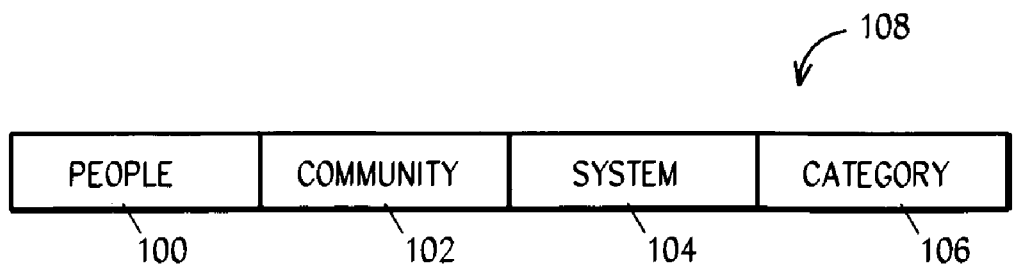
FIG. 1 is a diagrammatic representation of visualization portfolio strategically partitioned into four distinct domains in accordance with the preferred embodiment of the invention.

In accordance with the preferred embodiments of the invention, a system and method is provided for analyzing and visualizing usage patterns within arbitrary collections of documents.

In an exemplary embodiment of the invention, the functionality of the Lotus Discovery Server (LDS) is extended to visualize trends of an aggregate system. Useful visualizations of knowledge metric data store by LDS are determined, extracted, and visualized for a user.

A system in accordance with the preferred embodiment of the invention contains documents, tracks and time stamps document activity, and collects documents together into aggregates.

On its lowest level, LDS manages knowledge resources. A knowledge resources is any form of document that contains knowledge or information. Examples include Lotus WordPro Documents, Microsoft Word Documents, webpages, postings to newsgroups, etc. Knowledge resources are typically stored within knowledge repositories—such as Domino.Doc databases, websites, newsgroups, etc.

When LDS is first installed, an Automated Taxonomy Generator (ATG) subcomponent builds a hierarchy of the knowledge resources stored in the knowledge repositories specified by the user. For instance, a document about working with XML documents in the Java programming language stored in a Domino.Doc database might be grouped into a category named 'Home>Development>Java>XML'. This categorization will not move or modify the document, just record its location in the hierarchy. The hierarchy can be manually adjusted and tweaked as needed once initially created.

A category is a collection of knowledge resources and other subcategories of similar content. Categories represent a more abstract re-organization of the contents of physical repositories, without displacing the available knowledge resources.

Knowledge repositories are then grouped into sets, known as communities. A community is a set of repositories primarily utilized by some particular group of people. Communities are defined by administrative users of the system (unlike categories which can be created by LDS and then modified). If a user interacts with one of the repositories used to define Community A, then he is considered an active participant in that community. Thus, communities represent the physical storage of knowledge resources and provide a mechanism for LDS to observe the activity of a group of people.

As a user interacts with knowledge resources, LDS learns which categories they interact with the most. LDS maintains a score for the user, known as an affinity. An affinity is a rank that numerically captures how often a user interacts with a particular category compared to the level of interaction of other users. Affinities within the system are important in relation to the other affinities. Once a user's affinity reaches a certain threshold, LDS asks the user if he would like to publish that affinity. These affinities can then be made public, so that when other users search on a topic, LDS can identify users who are knowledgeable on that topic.

LDS maintains a score for the knowledge resources which are utilized to indicate how important they are to the users of the system. For instance, a document that has a lot of activity around it—such as responses, modifications or simply a high access rate—is perceived as more important than documents which are rarely accessed. This is generically referred to as 'document value'.

Another capability of LDS is its search functionality. Instead of returning only the knowledge resources (documents) that a standard web-based search engine might locate, LDS also returns the categories that the topic might be found within and the people that are most knowledge about that topic. LDS takes the users' affinities and the document values it has calculated into account when returning the results of a search. Thus, users with high affinities for a particular topic and documents that are rated with a higher document value are more likely to be returned. The present invention is unrelated to utilizing or extending this kind of localized searching functionality, but rather focuses on trends within the system on a more general level.

The system and method of the preferred embodiments of the invention are built on a framework that collectively integrates data-mining, user-interface, visualization, and server-side technologies. An extensible architecture provides a layered process of transforming data sources into a state that can be interpreted and outputted by visualization components. This architecture is implemented through Java, Servlets, JSP, SQL, XML, and XSLT technology, and essentially adheres to a model-view controller paradigm, where interface and implementation components are separated. This allows effective data management and server side matters such as connection pooling to be independent In accordance with the preferred embodiment of the invention, information visualization techniques are implemented through the three main elements including bar charts, pie charts, and tables. Given the simplicity of the visualization types themselves, the context in which they are contained is what makes them powerful mediums to reveal and magnify hidden knowledge dynamics within an organization.

Referring to FIG. 1, a visualization portfolio is strategically partitioned into four distinct domains, or explorers: people 100, community 102, system 104, and category 106. The purpose of these partitioned explorers 100–106 is to provide meaningful context for the visualizations. The raw usage pattern metrics produced from the Lotus Discovery Server (LDS) do not raise any significant value unless there is an applied context to it. In order to shed light on the hidden relationships behind the process of knowledge creation and maintenance, there is a need to ask many important questions. Who are the knowledge creators? Who are the ones receiving knowledge? What group of people are targeted as field experts? How are groups communicating with each other? Which categories of information are thriving or lacking activity? How is knowledge transforming through time? While answering many of these questions, four key targeted domains, or explorer types 100–106 are identified, and form the navigational strategy for user interface 108. This way, users can infer meaningful knowledge trends and dynamics that are context specific.

People Domain 100

People explorer 100 focuses on social networking, community connection analysis, category leaders, and affinity analysis. The primary visualization component is table listings and associations.

Community Domain 102

Community explorer 102 focuses on acceleration, associations, affinity analysis, and document analysis for Lotus K-Station communities. The primary visualization components are bar charts and table listings. Features include drill down options to view associated categories, top documents, and top contributors.

System Domain 104

System explorer 104 focuses on high level activity views such as authors, searches, accesses, opens, and responses for documents. The primary visualization components are bar charts (grouped and stacked). Features include zooming and scrollable regions.

Category Domain 106

Category explorer 106 focuses on lifespan, acceleration, affinity analysis, and document analysis of categories generated by a Lotus Discovery Server's Automated Taxonomy Generator. The primary visualization components are bar charts. Features include drill down options to view subcategories, top documents, top contributors, category founders, and document activity.

System Overview

Figure 2:
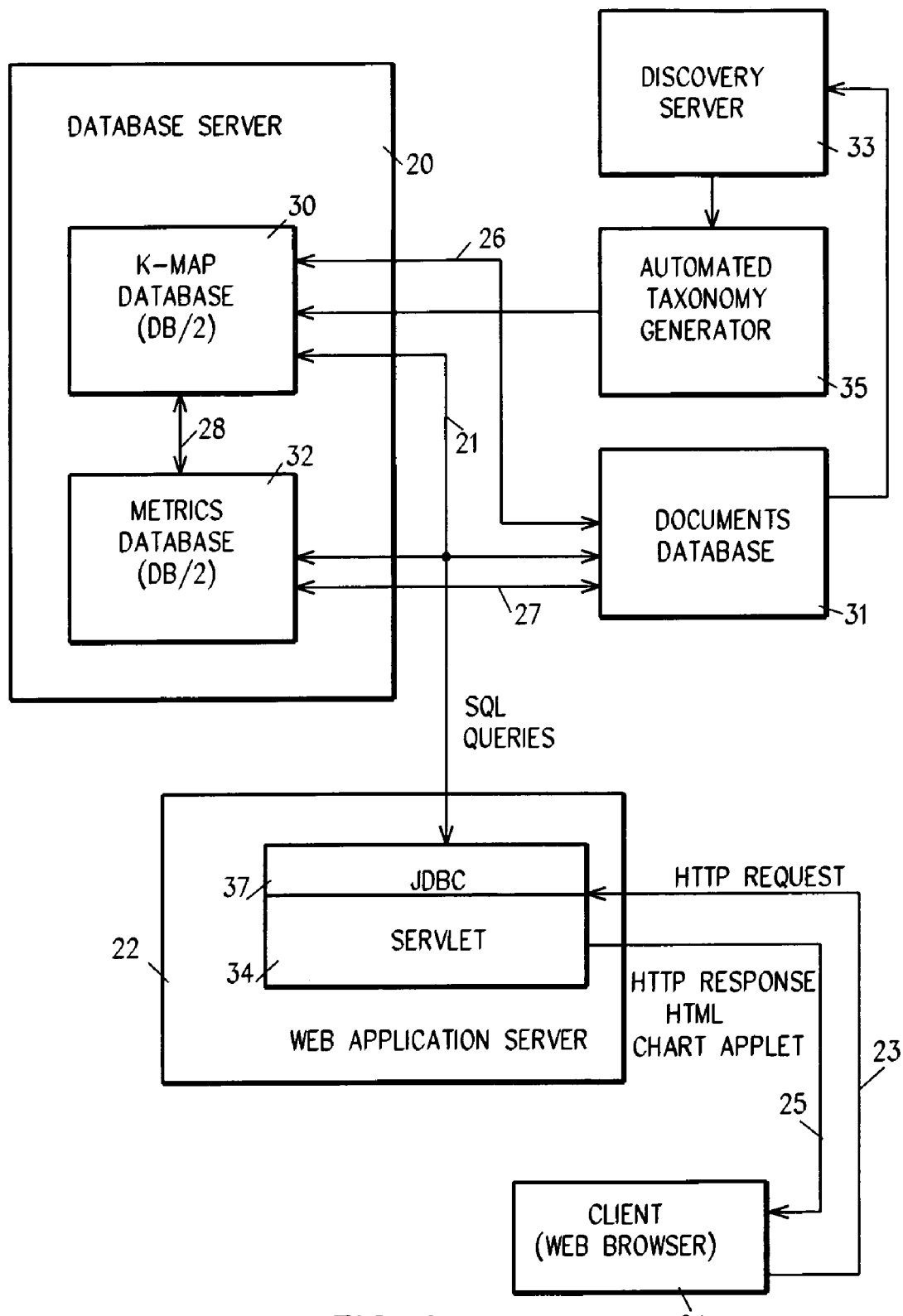
FIG. 2 is a system diagram illustrating a client/server system in accordance with the preferred embodiment of the invention.

Referring to FIG. 2, an exemplary client/server system is illustrated, including database server 20, discovery server 33, automated taxonomy generator 35, web application server 22, and client browser 24.

Knowledge management is defined as a discipline to systematically leverage information and expertise to improve organizational responsiveness, innovation, competency, and efficiency. Discovery server 33 (e.g. Lotus Discovery Server) is a knowledge system which may deployed across one or more servers. Discovery server 33 integrates code from several sources (e.g., Domino, DB2, InXight, KeyView and Sametime) to collect, analyze and identify relationships between documents, people, and topics across an organization. Discovery server 33 may store this information in a data store 31 and may present the information for browse/query through a web interface referred to as a knowledge map (e.g., K-map) 30. Discovery server 33 regularly updates knowledge map 30 by tracking data content, user expertise, and user activity which it gathers from various sources (e.g. Lotus Notes databases, web sites, file systems, etc.) using spiders.

Database server 20 includes knowledge map database 30 for storing a hierarchy or directory structure which is generated by automated taxonomy generator 35, and metrics database 32 for storing a collection of attributes of documents stored in documents database 31 which are useful for forming visualizations of information aggregates. The k-map database 30, the documents database 31, and the metrics database are directly linked by a key structure represented by lines 26, 27 and 28. A taxonomy is a generic term used to describe a classification scheme, or a way to organize and present information, Knowledge map 30 is a taxonomy, which is a hierarchical representation of content organized by a suitable builder process (e.g., generator 35).

A spider is a process used by discovery server 33 to extract information from data repositories. A data repository (e.g. database 31) is defined as any source of information that can be spidered by a discovery server 33.

Java Database Connectivity API (JDBC) 37 is used by servlet 34 to issue Structured Query Language (SQL) queries against databases 30, 31, 32 to extract data that is relevant to a users request 23 as specified in a request parameter which is used to filter data. Documents database 31 is a storage of documents in, for example, a Domino database or DB2 relational database.

The automated taxonomy generator (ATG) 35 is a program that implements an expectation maximization algorithm to construct a hierarchy of documents in knowledge map (K-map) metrics database 32, and receives SQL queries on link 21 from web application server 22, which includes servlet 34. Servlet 34 receives HTTP requests on line 23 from client 24, queries database server 20 on line 21, and provides HTTP responses, HTML and chart applets back to client 24 on line 25.

Discovery server 33, database server 20 and related components are further described in U.S. patent application Ser. No. 10/044,914 is now pending filed 15 Jan. 2002, published 17 Jul. 2003, Pub. No. 20030135606, for System and Method for Implementing a Metrics Engine for Tracking Relationships Over Time.

Figure 3:
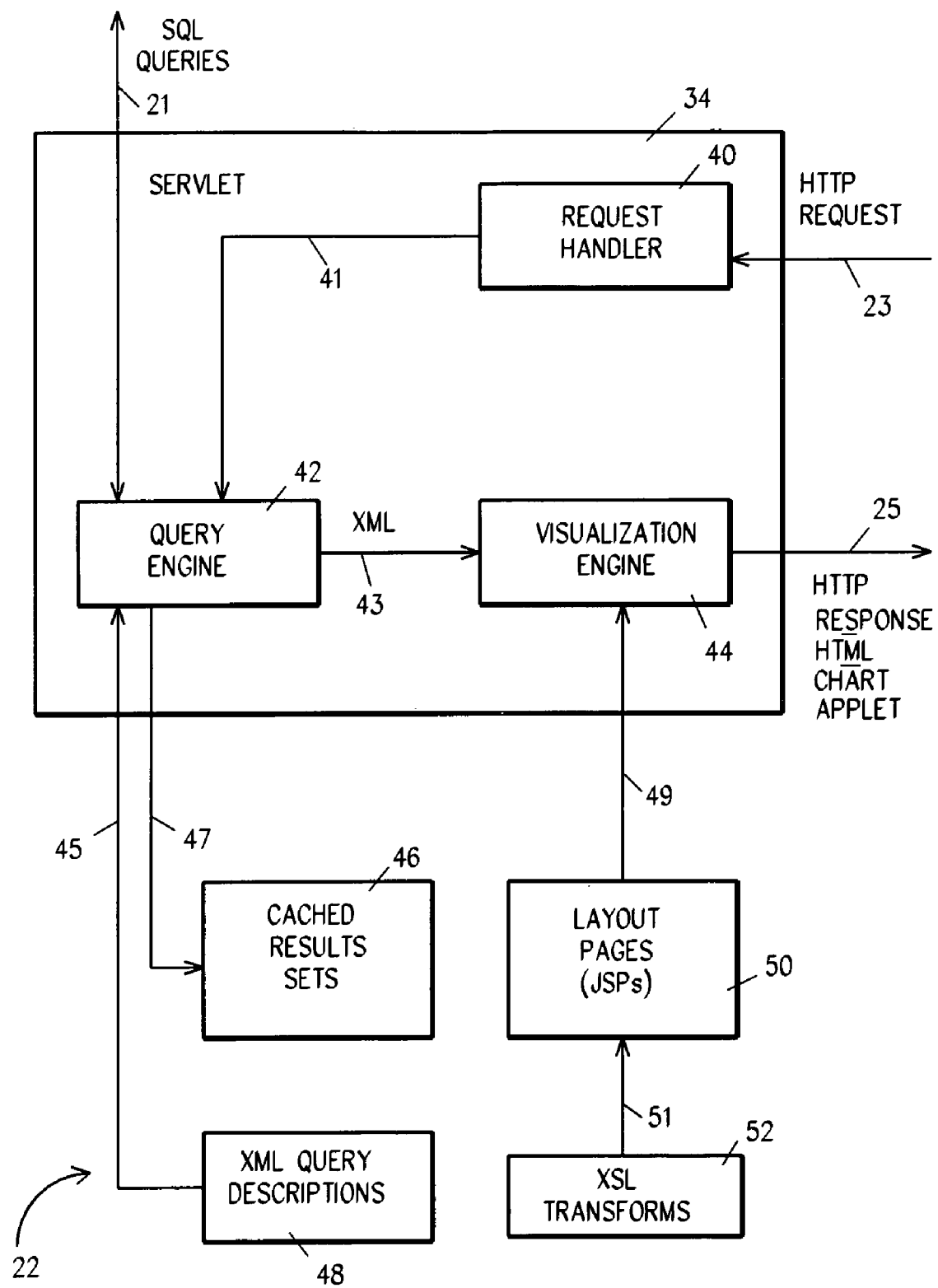
FIG. 3 is a system diagram further describing the web application server of FIG. 2.

Referring to FIG. 3, web application server 22 is further described. Servlet 34 includes request handler 40 for receiving HTTP requests on line 23, query engine 42 for generating SQL queries on line 21 to database server 20 and result set XML responses on line 43 to visualization engine 44. Visualization engine 44, selectively responsive to XML 43 and layout pages (JSPs) 50 on line 49, provides on line 25 HTTP responses, HTML, and chart applets back to client 24. Query engine 42 receives XML query descriptions 48 on line 45 and caches and accesses results sets 46 via line 47. Layout pages 50 reference XSL transforms 52 over line 51.

In accordance with the preferred embodiment of the invention, visualizations are constructed from data sources 32 that contain the metrics produced by a Lotus Discovery Server. The data source 32, which may be stored in an IBM DB2 database, is extracted through tightly coupled Java and XML processing.

Figure 4:
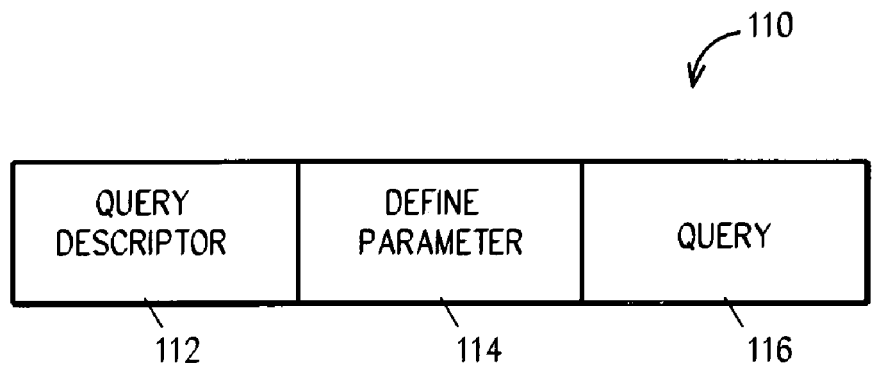
FIG. 4 is a diagrammatic representation of the XML format for wrapping SQL queries.

Referring to FIG. 4, the SQL queries 21 that are responsible for extraction and data-mining are wrapped in a result set XML format having a schema (or structure) 110 that provides three main tag elements defining how the SQL queries are executed. These tag elements are <queryDescriptor> 112, <defineparameter> 114, and <query> 116.

The <queryDescriptor> element 112 represents the root of the XML document and provides an alias attribute to describe the context of the query. This <queryDescriptor> element 112 is derived from http request 23 by request handler 40 and fed to query engine 42 as is represented by line 41.

The <defineparameter> element 114 defines the necessary parameters needed to construct dynamic SQL queries 21 to perform conditional logic on metrics database 32. The parameters are set through its attributes (localname, requestParameter, and defaultValue). The actual parameter to be looked up is requestParameter. The localname represents the local alias that refers to the value of requestParameter. The defaultValue is the default parameter value.

QRML structure 116 includes <query> element 116 containing the query definition. There can be one or more <query> elements 116 depending on the need for multiple query executions. A <data> child node element is used to wrap the actual query through its corresponding child nodes. The three essential child nodes of <data> are <queryComponent>, <useParameter>, and <queryAsFullyQualified>. The <queryComponent> element wraps the main segment of the SQL query. The <useParameter> element allows parameters to be plugged into the query as described in <defineParameter>. The <queryAsFullyQualified> element is used in the case where the SQL query 21 needs to return an unfiltered set of data.

When a user at client browser 24 selects a metric to visualize, the name of an XML document is passed as a parameter in HTTP request 23 to servlet 34 as follows:

---
<input type=hidden name="queryAlias" value="AffinityPerCategory">
---

In some cases, there is a need to utilize another method for extracting data from the data source 32 through the use of a generator Java bean. The name of this generator bean is passed as a parameter in HTTP request 23 to servlet 34 as follows:

---
<input type=hidden name="queryAlias"value= "PeopleInCommonByCommGenerator">
---

Once servlet 34 receives the XML document name or the appropriate generator bean reference at request handler 40, query engine 42 filters, processes, and executes query 21. Once query 21 is executed, data returned from metrics database 32 on line 21 is normalized by query engine 42 into an XML format 43 that can be intelligently processed by an XSL stylesheet 52 further on in the process.

Figure 5:
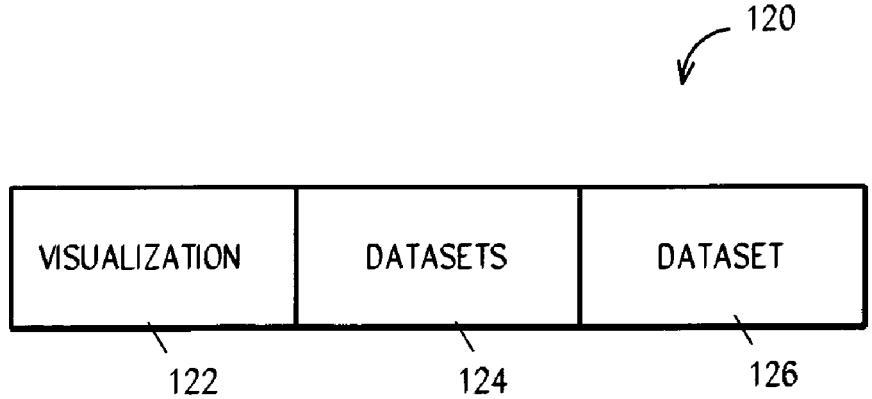
FIG. 5 is a diagrammatic representation of a normalized XML format, or QRML.

Referring to FIG. 5, the response back to web application server 22 placed on line 21 is classified as a Query Response Markup Language (QRML) 120. QRML 120 is composed of three main elements. They are <visualization> 122, <datasets> 124, and <dataset> 126. QRML structure 120 describes XML query descriptions 48 and the construction of a result set XML on line 43.

The <visualization> element 122 represents the root of the XML document 43 and provides an alias attribute to describe the tool used for visualization, such as a chart applet, for response 25.

The <datasets> element 124 wraps one or more <dataset> collections depending on whether multiple query executions are used.

The <dataset> element 126 is composed of a child node <member> that contains an attribute to index each row of returned data. To wrap the raw data itself, the <member> element has a child node <elem> to correspond to column data.

Data Translation and Visualization

Referring further to FIG. 3, for data translation and visualization, in accordance with the architecture of an exemplary embodiment of the invention, an effective delineation between the visual components (interface) and the data extraction layers (implementation) is provided by visualization engine 44 receiving notification from query engine 42 and commanding how the user interface response on line 25 should be constructed or appear. In order to glue the interface to the implementation, embedded JSP scripting logic 50 is used to generate the visualizations on the client side 25. This process is two-fold. Once servlet 34 extracts and normalizes the data source 32 into the appropriate XML structure 43, the resulting document node is then dispatched to the receiving JSP 50. Essentially, all of the data packaging is performed before it reaches the client side 25 for visualization. The page is selected by the value parameter of a user HTTP request, which is an identifier for the appropriate JSP file 50. Layout pages 50 receive the result set XML 120 on line 43, and once received an XSL transform takes effect that executes a transformation to produce parameters necessary to launch the visualization.

For a visualization to occur at client 24, a specific set of parameters needs to be passed to the chart applet provided by, for example, Visual Mining's Netcharts solution. XSL transformation 52 generates the necessary Chart Definition Language (CDLs) parameters, a format used to specify data parameters and chart properties. Other visualizations may involve only HTML (for example, as when a table of information is displayed).

An XSL stylesheet (or transform) 52 is used to translate the QRML document on line 43 into the specific CDL format shown above on line 25.

This process of data retrieval, binding, and translation all occur within a JSP page 50. An XSLTBean opens an XSL file 52 and applies it to the XML 43 that represents the results of the SQL query. (This XML is retrieved by calling queryResp.getDocumentElement( )). The final result of executing this JSP 50 is that a HTML page 25 is sent to browser 24. This HTML page will include, if necessary, a tag that runs a charting applet (and provides that applet with the parameters and data it needs to display correctly). In simple cases, the HTML page includes only HTML tags (for example, as in the case where a simple table is displayed at browser 24). This use of XSL and XML within a JSP is a well-known Java development practice.

In Ser. No. 10/286,211 is now pending filed 31 Oct. 2002 for "SYSTEM AND METHOD FOR DETERMINING FOUNDERS OF AN INFORMATION AGGREGATE", Table 1 illustrates an example of XML structure 110; Table 2 illustrates an example of the normalized XML, or QRML, structure; Table 3 illustrates an example of CDL defined parameters fed to client 24 on line 25 from visualization engine 44; Table 4 illustrates an example of how an XSL stylesheet 52 defines translation; and Table 5 is script illustrating how pre-packaged document node 43 is retrieved and how an XSL transformation 52 is called to generate the visualization parameters.

An exemplary embodiment of the system and method of the invention may be built using the Java programming language on the Jakarta Tomcat platform (v3.2.3) using the Model-View-Controller (MVC) (also known as Model 2) architecture to separate the data model from the view mechanism.

Information Aggregate

Figure 6:
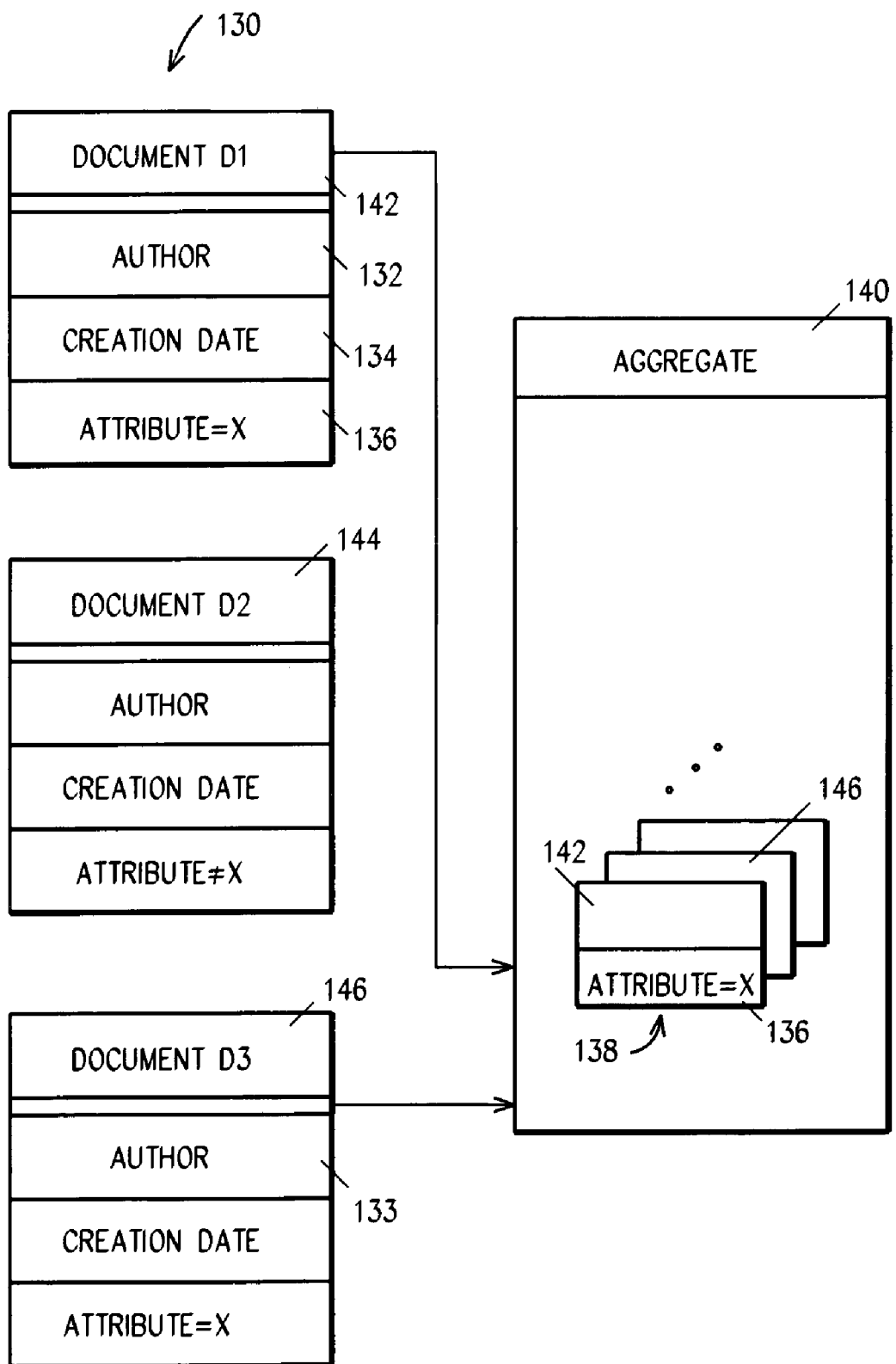
FIG. 6 is a diagrammatic representation of an aggregate in accordance with the preferred embodiment of the invention.

Referring to FIG. 6, a system in accordance with the present invention contains documents 130 such as Web pages, records in Notes databases, and e-mails. Each document 130 is associated with its author 132, and the date of its creation 134. A collection of selected documents 130 forms an aggregates 140. An aggregate 140 is a collection 138 of documents 142, 146 having a shared attribute 136 having non-unique values. Documents 138 can be aggregated by attributes 136 such as:

Category—a collection of documents 130 about a specific topic, a logical organization of knowledge resources based on similarities in content or focus, or due to the manner in which a group utilizes them.

Community—a collection of documents 130 of interest to a given group of people. This type of collection can be formed by identifying a set of knowledge repositories used by a community or team, and then forming the collection from the union of documents contained in the specified repositories. A community is a group of persons with a common interest, goal, or focus who communicate through some means over a period of time in an effort to further their individual and collective knowledge about that interest.

Location—a collection of documents 130 authored by people in a geographic location (e.g. USA, Utah, Massachusetts, Europe).

Job function or role—a collection of documents 130 authored by people in particular job roles (e.g. Marketing, Development).

Group (where group is a list of people)—a collection of documents authored by a given set of people.

Any other attributed 136 shared by a group (and having non-unique values).

Usage Trends within an Aggregate

In accordance with a preferred embodiment of the invention, a method for analyzing and visualizing the usage patterns within arbitrary collections of documents is provided. This type of analysis can augment the more common topical analyses in the following ways:

1. An analysis of usage patterns can identify behaviors within teams that can then be correlated with team performance. If a manager can identify specific behaviors associated with high-performing teams, those behaviors can be encouraged in other teams.
2. Changes in usage patterns over time can assist managers in evaluating the effectiveness of change initiatives.

There are several ways to analyze the kinds of activity that occur within a particular aggregate. A simple count of activity types within the aggregate may be determined and the results displayed in a table or bar chart. Analysis may be performed across a set of aggregates, and a composite distribution of activity generated, or a cross-aggregate comparison. The distribution of activity may be periodically evaluated to show changes in activity over time.

The analysis of usage trends may also include other kinds of algorithms (various weighting approaches, for example).

An exemplary embodiment of the invention uses the Lotus Discovery Server, a system that supports the collection of documents into information aggregates. The aggregates supported by the Discovery Server are categories and communities. A category is a collection of documents that are concerned with the same topic.

A community is a collection of documents that are of interest to a particular group of people. The Discovery Server allows a community to be defined based on the information repositories used by the community.

The Discovery Server tracks activity metrics for the documents that it organizes, such as when a document is created, opened, modified, responded to, or linked to.

Figure 7:
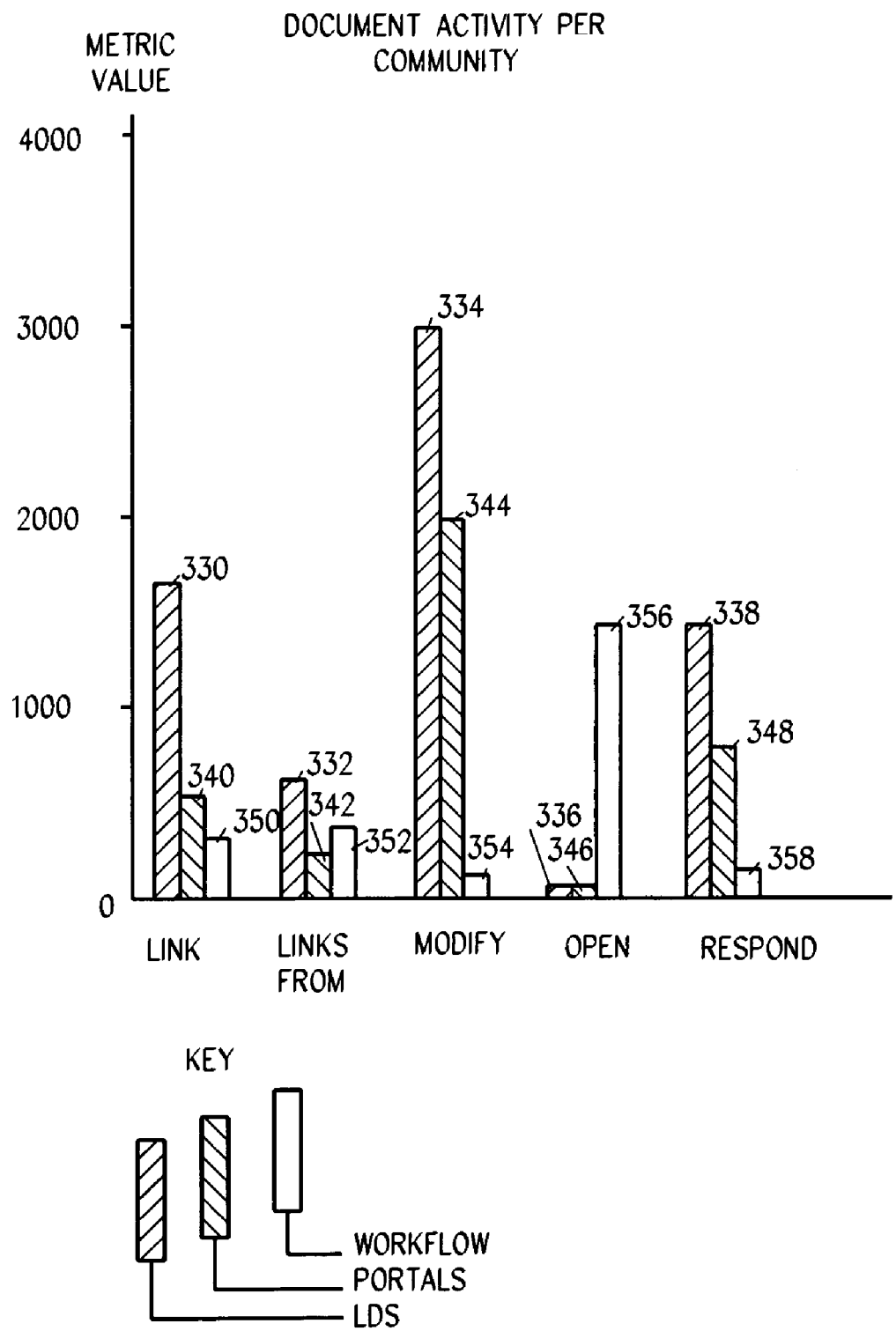
FIG. 7 is a bar chart representation of usage patterns within an information aggregate.

Referring to FIG. 7, in accordance with this exemplary embodiment of the invention, the distribution of activities link, links from, modify, open, and respond is analyzed by community, and the results plotted in a bar chart. This example shows how three different collections of documents (organized by communities LDS, portals, and workflow) are used. This can be helpful in understanding the behaviors of the teams that these collections represent. For example, the LDS community has a high proportion 330 of LINK metrics. LINKs 330, 340, 350, 332, 242, 352 represent the number of times that URLs or doclinks are encountered in the documents that make up the collection. By way of example, upon investigation it may be discovered that the LDS team often posts documents that they find on interesting Web sites. Such documents usually contain a number of URLs to other sites. This, then, reveals something about the way that the LDS team shares information.

The LDS and Portals community have a higher proportion of MODIFIED metrics 334, 344, respectively, than the Workflow community. The MODIFIED metrics 334, 344, 354 represent the number of times someone edits an existing document. Upon investigation, it may be determined that the collaborative applications used by the LDS and Portal communities allow one to put documents through a review cycle, and each review increments the MODIFIED count. The Workflow community uses a different collaboration tool that does not behave this way, so this helps a user to understand the tools that the various communities use to collaborate. The LDS community has a larger number of RESPONSE metrics 338 than the other communities 348, 358. Upon investigation, it may be discovered that the LDS community or team uses threaded discussions, while the other teams don't. This again reveals something about how the LDS team shares information.

Similar visualization and analysis of open metrics 336, 346, and 356 may reveal characteristics of the workflow and other graphed communities.

If, for example, it is known that the LDS team is a highly productive team, this graph could be used to identify behaviors unique to the LDS team. Such behaviors are worth examining, to see whether they represent best practices that should be transplanted into the other communities.

Figure 8:
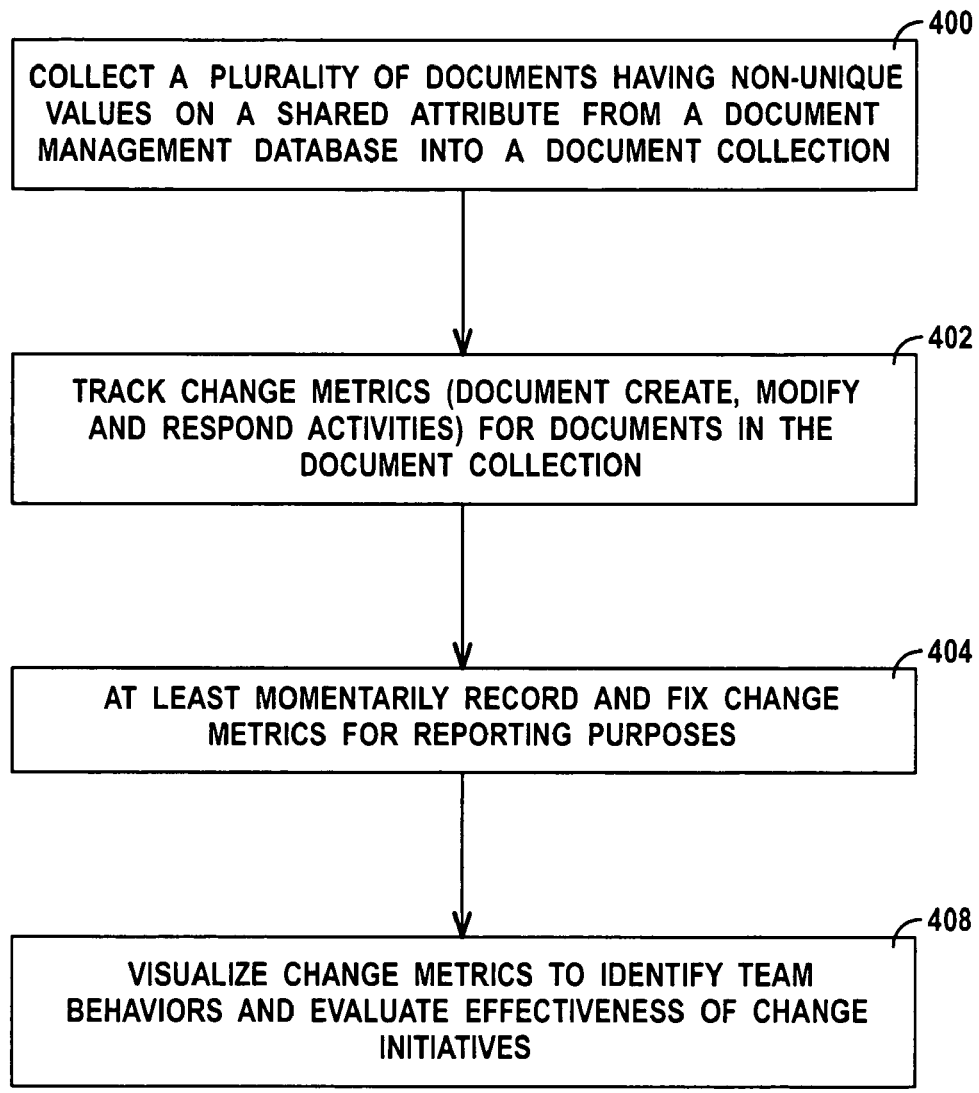
FIG. 8 is a flow chart representation of a preferred embodiment of the method of the invention.

Referring to FIG. 8, a method for evaluating document collections 140 includes in step 400 collecting a plurality of documents 130 (FIG. 6) having non-unique values on a shared attribute 136 from documents database 31 (FIG. 2)

into a document collection 140; in step 402 tracking change metrics 334, 338 (FIG. 7) with respect to documents in the document collection (140, FIG. 6; LDS, FIG. 7) and in step 404 at least momentarily recording and fixing the change metrics in computer storage 32 (FIG. 2) for reporting purposes (FIG. 2, line 25); and in step 408 visualizing (FIG. 7) the change metrics 334, 338 to identify team (FIG. 7, community) behaviors and evaluate effectiveness of change initiatives.

Advantages over the Prior Art

It is an advantage of the invention that there is provided an improved system and method for evaluating usage patterns in aggregates.

ALTERNATIVE EMBODIMENTS

It will be appreciated that, although specific embodiments of the invention have been described herein for purposes of illustration, various modifications may be made without departing from the spirit and scope of the invention. In particular, it is within the scope of the invention to provide a computer program product including a computer readable, storage or memory medium, such as a magnetic or optical tape or disc, or the like, for storing program instructions readable by a computer, for controlling the operation of a computer according to the method of the invention and/or to structure its components in accordance with the system of the invention.

Further, each step of the method may be executed on any general computer, such as IBM Systems designated as zSeries, iSeries, xSeries, and pSeries, or the like and pursuant to one or more, or a part of one or more, program elements, modules or objects generated from any programming language, such as C++, Java, Pl/1, Fortran or the like.

Accordingly, the scope of protection of this invention is limited only by the following claims and their equivalents.

We claim:

1. A computer implemented method for evaluating document collections to correlate team behaviors with team performance, evaluate organizational chance initiatives, and to encourage other teams to implement behaviors of high-performing teams, comprising:
   collecting from a database of a document management system a plurality of documents having non-unique values on a shared attribute into a first document collection, said document collection being a logical subset of documents stored in said document management system for analysis;
   tracking and at least momentarily recording and fixing for reporting purposes change metrics with respect to documents in said first document collection, said change metrics being creating, modifying, and responding activities by team members with respect to said documents; and
   visualizing said change metrics to identify team behaviors and evaluate the effectiveness of change initiatives including identifying behaviors within teams. correlating said behaviors with performance, said chanae initiatives including encouraging behaviors of high-performing teams for use by other teams.

2. The method of claim 1, further comprising:
   tracking said change metrics with respect to time of occurrence; and
   visualizing said change metrics with respect to time of occurrence.

3. The method of claim 1, further comprising:
   tracking said change metrics across a set of document collections; and
   visualizing a composite distribution of said change metrics.

4. The method of claim 1, further comprising:
   tracking said change metrics across a set of document collections; and
   visualizing a comparison across document collections of said change metrics.

5. A computer implemented system for evaluating a document collection to correlate team behaviors with team performance, evaluate organizational change initiatives, and to encourage other teams to implement behaviors of high-performing teams, comprising:
   means for collecting from a database of a document management system a plurality of documents having non-unique values on a shared attribute into a first document collection, said document collection being a logical subset of documents stored in said document management system for analysis;
   means for tracking and at least momentarily recording and fixing for reporting purposes change metrics with respect to documents in said first document collection, said change metrics being creating, modifying, and responding activities of team members with respect to said fef-said documents; and
   means for visualizing said change metrics to selectively identify team behaviors and evaluate the effectiveness of change initiatives including identifying behaviors within teams, correlating said behaviors with performance, said change initiatives including encouraging behaviors of high-performing teams for use by other teams.

6. A computer system for evaluating a document collection to correlate team behaviors with team performance, evaluate organizational change initiatives, and to encourage other teams to implement behaviors of high-performing teams, comprising:
   a metrics database for storing document indicia including document attributes, persons associated with said document and change metrics, said change metrics including creating, modifying, and responding activities of team members with respect to documents stored in a document database of a document management system;
   a query engine for collecting from said document database a plurality of documents having non-unique values on a shared attribute into a document collection, said document collection being a logical subset of documents in said document database for analysis, and for tracking change metrics with respect to said document collection; and
   a visualization engine for visualizing said change metrics to identify team behaviors and evaluate the effectiveness of change initiatives including identifying behaviors within teams, correlating said behaviors with performance. said chanae initiatives including encouraging behaviors of high-performing teams for use by other teams.

7. The computer system of claim 6, said metrics database further for tracking said change metrics with respect to time of occurrence; and said visualization engine further for visualizing said change metrics with respect to time of occurrence.

8. The computer system of claim 6, said metrics database further for tracking said change metrics across a set of document collections; and said visualization engine further for visualizing a composite distribution of said change metrics.

9. The computer system of claim 6, said metrics database further for tracking said change metrics across a set of document collections; and said visualization engine further for visualizing a comparison of said change metrics across a plurality of document collections.

10. A program storage device readable by a computer, tangibly embodying a program of instructions executable by a computer for evaluating document collections to correlate team behaviors with team performance, evaluate organizational change initiatives to encourage other teams to implement behaviors of high-performing teams, said program of instructions comprising:
    instructions for collecting a plurality of documents having non-unique values on a shared attribute from a database of a document management system into a first document collection, said document collection being a logical subset of documents for analysis;
    instructions for tracking and at least momentarily recording and fixing in computer storage for reporting purposes change metrics with respect to documents in said first document collection, said change metrics being creating, modifying, and responding activities for said first document collection; and
    instructions for visualizing said change metrics to identify team behaviors and evaluate the effectiveness of said change initiatives including identifying behaviors within teams, correlating said behaviors with performance, said change initiatives including encouraging behaviors of high-performing teams for use by other teams.

11. The program storage device of claim 10, said program of instructions further comprising:
    instructions for tracking said change metrics with respect to time of occurrence; and
    instructions for visualizing said change metrics with respect to time of occurrence for evaluating the effectiveness of change initiatives.

12. The program storage device of claim 10, said program of instructions further comprising:
    instructions for tracking said change metrics across a set of document collections; and
    instructions for visualizing a composite distribution of said change metrics.

13. The program storage device of claim 10, program of instructions further comprising:
    instructions for tracking said change metrics across a set of document collections; and
    instructions for visualizing a comparison of said change metrics across a plurality of document collections.

14. A program storage device readable by a computer, tangibly embodying a program of instructions executable by a computer for evaluating document collections to correlate team behaviors with team performance, evaluate organizational change initiatives, and to encourage other teams to implement behaviors of high-performing teams, said program of instructions comprising:
    a computer readable storage medium;
    first program instructions for storing document indicia in a metrics database, said indicia including document attributes, associated persons and change metrics, said change metrics being creating, modifying, and responding activities for said documents;
    second program instructions, responsive to a user request and said metrics database, for collecting documents having same, unique attributes in a document collection, said document collection being a logical subset of documents for analysis;
    third program instructions for tracking and at least momentarily recording and fixing for reporting purposes change metrics with respect to said documents for said document collection;
    fourth program instructions for visualizing said change metrics to identify team behaviors and evaluate the effectiveness of change initiatives including identifying behaviors within teams, correlating said behaviors with performance, said chance initiatives including encouraging behaviors of high-performing teams for use by other teams; and
    said first, second, third and forth program instructions being recorded on said computer readable storage medium.

15. A computer program product including a program of instructions for evaluating document collections to correlate team behaviors with team performance, evaluate organizational chance initiatives, and to encourage other teams to implement behaviors of high-performing teams, comprising:
    instructions for collecting a plurality of documents having non-unique values on a shared attribute into a first document collection for analysis, said document collection being a logical subset of documents stored in a database of a document management system;
    instructions for tracking change metrics with respect to said logical subset of documents in said first document collection, said usage metrics being user activities of creating, modifying, and responding activities with respect to documents within said document collection; and
    visualizing said change metrics selectively to identify team behaviors and evaluate effectiveness of change initiatives including identifying behaviors within teams, correlating said behaviors with performance, said chanae initiatives including encouraging behaviors of high-performing teams for use by other teams.

* * * * *